United States Patent [19]

Tyler

[11] Patent Number: 4,531,216

[45] Date of Patent: Jul. 23, 1985

[54] AZIMUTHALLY POLARIZED BEAM QUALITY IMPROVEMENT SYSTEM

[75] Inventor: Glenn A. Tyler, Mission Viejo, Calif.

[73] Assignee: Rockwell International Corporation, El Segundo, Calif.

[21] Appl. No.: 263,450

[22] Filed: May 14, 1981

[51] Int. Cl.$^3$ ............................................. H01S 3/10
[52] U.S. Cl. ...................................... 372/9; 372/95; 372/106; 350/394; 350/395; 350/619; 350/616
[58] Field of Search ................. 372/9, 106, 95, 98, 372/93, 99; 350/299, 288, 294, 394, 395; 356/350

[56] References Cited

U.S. PATENT DOCUMENTS 4,050,036  9/1977  Chambers et al. ................. 372/95
4,312,570  1/1982  Southwell ......................... 350/288

OTHER PUBLICATIONS

Chodzko et al., "Annular (HSURIA) Resonators: Some Experimental Studies Including Polarization Effects", Applied Optics, vol. 19, No. 5, Mar. 1980.
Southwell, "Multilayer Coatings Producing 90° Phase Change", Applied Optics, vol. 18, No. 11, 1 Jun. 1979.
Fink; "Polarization Effects of Axicons", Applied Opt., vol. 18, No. 5, 1 Mar. 1979.
"Performance of an Annular Resonator with a Polarizer in the Annular Leg", by Guhn et al., App. Optics, vol. 20, No. 23, 1 Dec. 1981.
"Split-Mode Unstable Resonator", Freiberg et al.; App. Optics, vol. 16, No. 5, 1977.

Primary Examiner—James W. Davie
Assistant Examiner—Léon Scott, Jr.
Attorney, Agent, or Firm—H. Fredrick Hamann; Harry B. Field

[57] ABSTRACT

A two-mirror system for transforming an azimuthally or linearly polarized laser beam into a beam having a number of sections, the average phase and polarization of each section being substantially similar. Both mirrors are segmented into eight pie-shaped sections, each of which contains a coating that gives a ±90° phase shift or the appropriate uniform optical path difference.

13 Claims, 7 Drawing Figures

| SEGMENT CENTERED AT ANGLE (DEGREES) | FIRST MIRROR 36 | | SECOND MIRROR 38 | |
|---|---|---|---|---|
| | PHASE DELAY, $d$ | PHASE SHIFT | PHASE DELAY, $d$ | PHASE SHIFT |
| 0 | $-\frac{\pi}{4}$ | | | $\frac{\lambda}{4}$ |
| 45 | | $\frac{\lambda}{4}$ | 0 | |
| 90 | $\frac{\pi}{4}$ | | | $-\frac{\lambda}{4}$ |
| 135 | | $-\frac{\lambda}{4}$ | 0 | |
| 180 | $\frac{3\pi}{4}$ | | | $\frac{\lambda}{4}$ |
| 225 | | $\frac{\lambda}{4}$ | $\pi$ | |
| 270 | $-\frac{3\pi}{4}$ | | | $-\frac{\lambda}{4}$ |
| 315 | | $-\frac{\lambda}{4}$ | $\pi$ | |

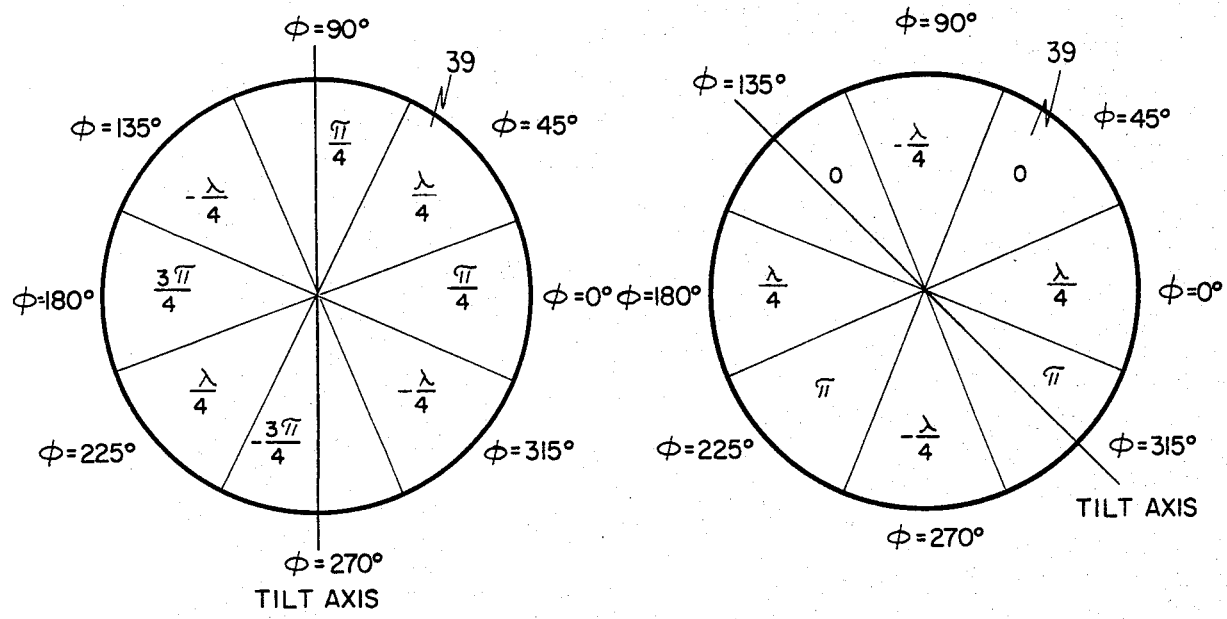
Fig. 2,    Fig. 3,
| SEGMENT CENTERED AT ANGLE (DEGREES) | FIRST MIRROR 36 | | SECOND MIRROR 38 | |
|---|---|---|---|---|
| | PHASE DELAY, $\delta$ | PHASE SHIFT | PHASE DELAY, $\delta$ | PHASE SHIFT |
| 0 | $-\frac{\pi}{4}$ | | | $\frac{\lambda}{4}$ |
| 45 | | $\frac{\lambda}{4}$ | 0 | |
| 90 | $\frac{\pi}{4}$ | | | $-\frac{\lambda}{4}$ |
| 135 | | $-\frac{\lambda}{4}$ | 0 | |
| 180 | $\frac{3\pi}{4}$ | | | $\frac{\lambda}{4}$ |
| 225 | | $\frac{\lambda}{4}$ | $\pi$ | |
| 270 | $-\frac{3\pi}{4}$ | | | $-\frac{\lambda}{4}$ |
| 315 | | $-\frac{\lambda}{4}$ | $\pi$ | |
Fig. 4,

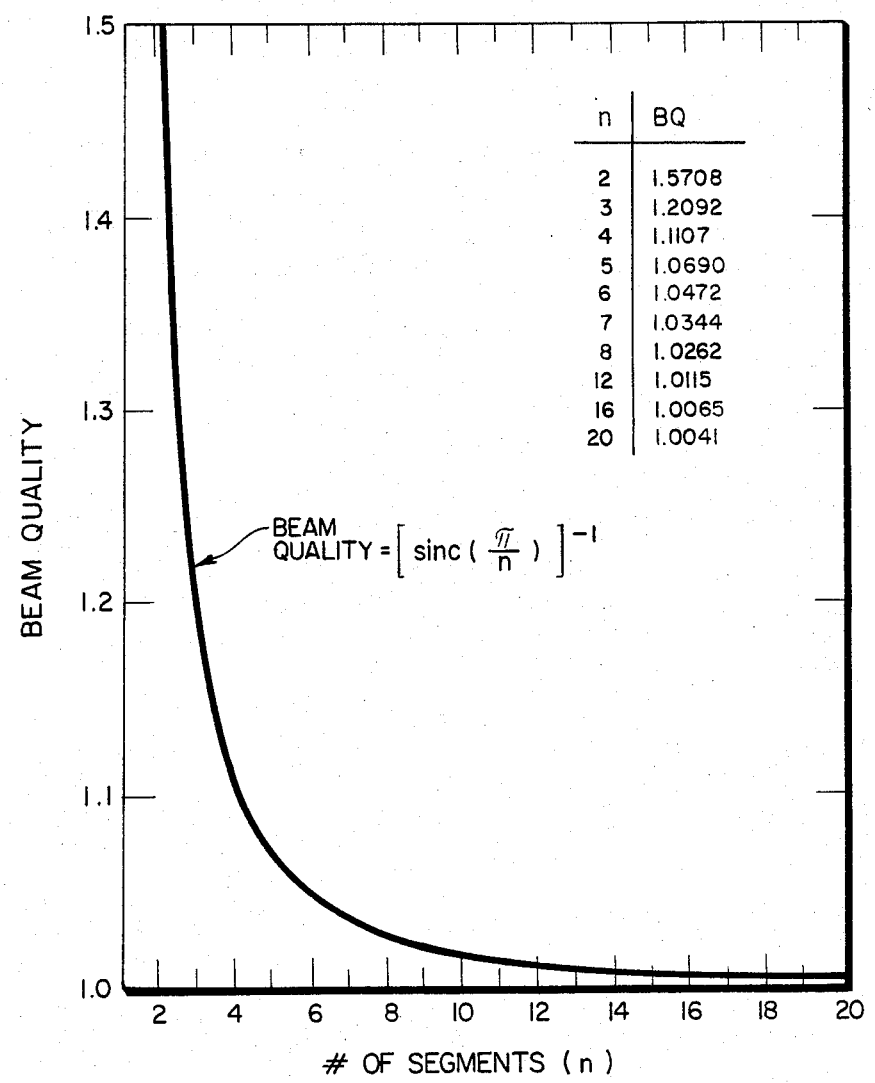
Fig.7,

AZIMUTHALLY POLARIZED BEAM QUALITY IMPROVEMENT SYSTEM

BACKGROUND OF THE INVENTION

1. Field of the Invention

The invention relates to a system of mirrors for improving the quality of an azimuthally polarized beam. More specifically, it relates to mirrors that transform an azimuthally polarized cylindrical beam into sections that are substantially equal in phase and polarization.

2. Description of the Prior Art

Certain modern laser concepts have a gain media which fills a cylindrical annulus. In order to produce an annular-shaped electromagnetic mode, resonators have been devised which use a pair of conical mirrors called an axicon. The axicon, which converts a cylindrical beam to an annular beam and vice versa will, in general, affect the polarization of the beam and resonator mode. In many caes, an electromagnetic mode with azimuthal polarization results. In other words, the electric vector is everywhere oriented tangential to a circle centered on the axicon axis.

This azimuthally polarized beam, by virtue of the symmetry of the electric vectors, will have zero intensity on axis regardless of how far it propagates. For high energy lasers, this zero intensity on axis is desirable inside the resonator because it protects the axicon tip from an otherwise high intensity. However, once the beam exits the laser it continues, by symmetry, to have a dark spot of zero intensity at its center so as to reduce the intensity on any work piece or target onto which the beam is focused or otherwise directed.

It has been suggested ("Polarization Effects of Axicons", Applied Optics, Vol. 18, No.5, Mar. 1, 1979, by David Fink) that axicons might be designed to alter the mode structure inside the resonator. Methods of coating axicons inside resonators have been developed that avoid the azimuthally polarized mode. These changes in the polarization of the resonator mode improve the quality and behavior of the output beam. However, these changes in polarization are accompanied by a very large increase in intensity on the intracavity axicon tip, threatening its destruction in a high energy device.

It would be desirable to be able to retain the azimuthal polarization inside the resonator (with its low axicon tip intensity) but convert the polarization of the output beam to linearly or circularly polarized light. Heretofore, no technology to achieve this was known.

OBJECTS OF THE INVENTION

Therefore, an object of the present invention is to provide an azimuthally polarized beam quality improvement system that improves the beam quality of an azimuthally polarized beam.

Another object of the present invention is to provide an azimuthally polarized beam quality improvement system that converts an azimuthally polarized beam to a beam having circular polarized sections wherein the phase and polarization of each section is converted so that the average phase and polarization of each section is substantially similar to the other sections.

Yet another object of the present invention is to provide an azimuthally polarized beam quality improvement system that focuses the beam from an annular chemical laser.

Still a further object of the present invention is to provide an azimuthally polarized beam quality improvement system that eliminates the on-axis zero intensity of an azimuthally polarized beam caused by the symmetry of the electric vectors.

Another object of the present invention is to provide an azimuthally polarized beam quality improvement system that increases the far field irradiance of a beam from an annular chemical laser without increasing the irradiance on the tip of an axicon used to compact the beam.

Yet another object of the present invention is to provide an azimuthally polarized beam quality improvement system that converts an azimuthally polarized beam with poor qualities to a beam having substantially similar qualities to that of a uniformly linearly polarized or circular polarized beam.

Still a further object of the present invention is to provide an azimuthally polarized beam quality improvement system that also converts a radially polarized beam to a beam having circular polarized sections wherein the phase and polarization of each section is converted so that the average phase and polarization of each section is substantially similar to the other sections.

Other objects, advantages, and novel features of the present invention will become apparent from the following detailed description of the invention when considered in conjunction with the accompanying drawings.

SUMMARY OF THE INVENTION

The invention comprises two or more mirrors, each divided into angular sections, each section bearing the appropriate coating necessary to produce the phase and polarization shifts desired for that section of the beam. Two such mirrors are capable of dividing an azimuthally polarized beam or a radially polarized beam, of circular cross-section into eight angular sections of 45°, each section of the resultant beam having an average polarization and phase substantially similar to every other section. The two circular mirrors are each divided into eight pie-shaped sections, each section being appropriately coated with (1) a thin layer of metal a fraction of a wave length thick to give the phase shift appropriate to that section, and (2) a dielective multi-layer coating capable of retarding or advancing the phase of component of polarization ±90° relative to the other component of polarization. The first mirror reflects the beam through an angle of 90°. The second mirror also reflects the beam through an angle of 90° but is oriented so that the beam moves out of the plane of the first reflection by 45°.

BRIEF DESCRIPTION OF THE DRAWINGS

FIG. 2 is a diagram of an eight-sectional mirror with various coatings applied.

FIG. 3 is a diagram of a second eight-sectional mirror with various coatings applied.

FIG. 4 is a chart summarizing the beam travel history.

FIG. 7 is a graph showing the beam quality versus the number of sections.

DETAILED DESCRIPTION OF THE PREFERRED EMBODIMENTS

Figure 1:
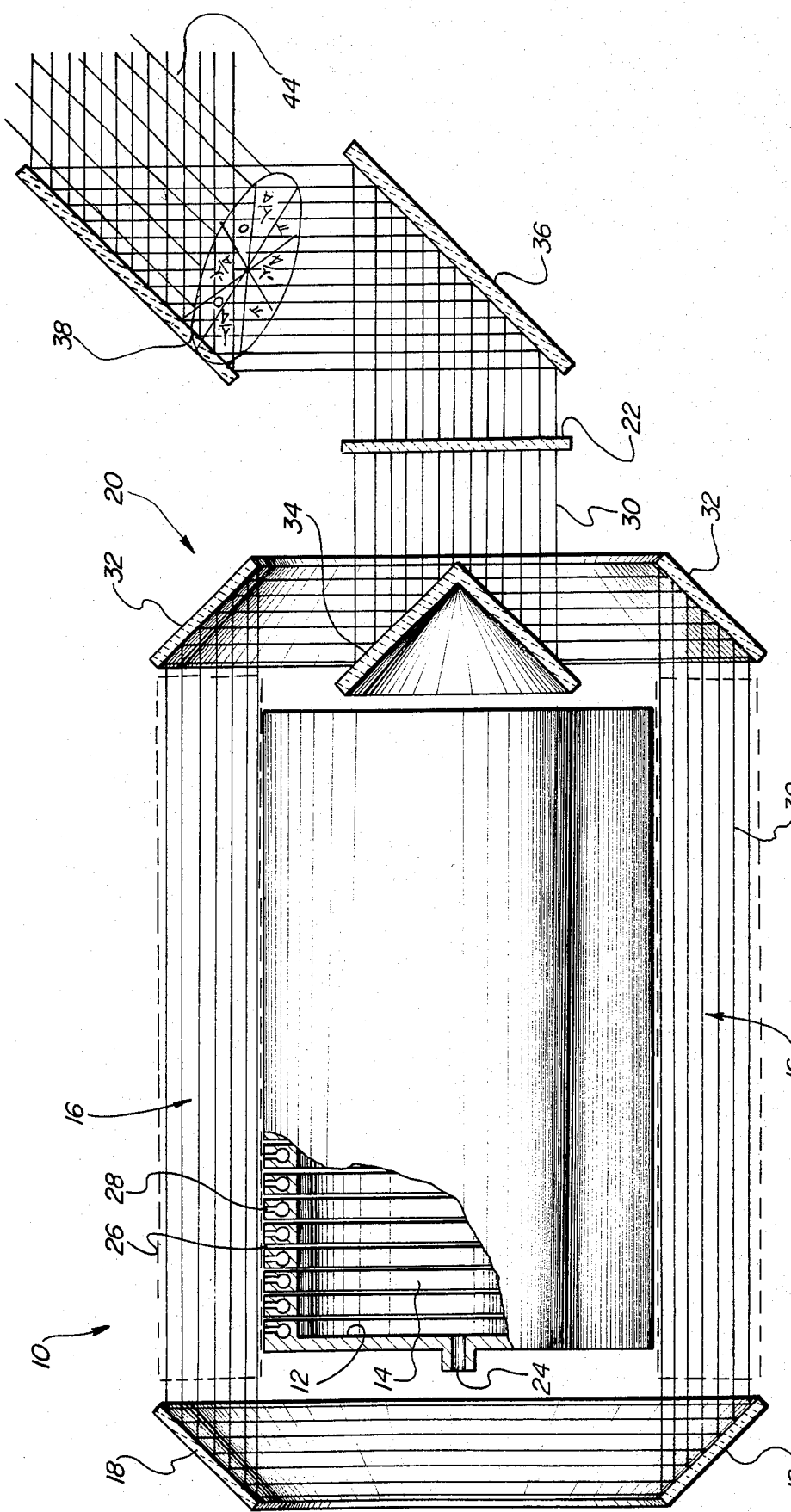
FIG. 1 is a diagram of an annular chemical laser directing an azimuthally polarized beam onto two mirrors.

Referring now to FIG. 1, there is shown a chemical laser, generally designated 10, including a tube 12, combustion chamber 14, active region 16, rear cone 18, axicon, generally designated 20, and output coupler 22. The chemical laser 10 receives reactants for combustion through the orifice 24 in the tube 12. Any reactants generally considered for chemical lasers, such as hydrogen and fluorine, may be used.

The tube 12 is cylindrical in shape and includes, in addition to the orifice 24, a plurality of arcuate nozzle slits 26 and nozzle openings 28 for directing the reactants radially outward through 360°. As the reactants flow outward, they mix creating the active region 16. The nozzle openings 28 are normally a series of aligned holes interspaced between each of the arcuate nozzle slits; however, any method of directing the reactants into the area around the tube 12 may be used.

As the reactants exit the tube 12, they chemically react, creating an annular active region 16. An annular laser beam 30 is formed by the active region 16 and within the resonator cavity defined by the rear cone 18, axicon 20, and the output coupler 22.

The rear cone 18 is actually a frustoconical section whose angle is such that the beam 30 passing through the active region 16 is reflected twice off the rear cone 18 to pass through the active region 180° around the tube 12.

The axicon 20 includes an outer cone 32 and an inner cone 34. The beam 30 reflects off the outer cone 32 onto inner cone 34 and to the output coupler 22 in the form of a compact, or cylindrical beam. The output coupler 22 reflects part of the beam 30 back onto the axicon 20. The output coupler 22 may be any type of reflective device, such as a feedback mirror or a partial reflecting mirror, that allows a portion of the beam 30 to exit the resonant cavity. More specifically, a resonant cavity is formed by the optical alignment of the rear cone 18, outer cone 32, inner cone 34, and output coupler 22.

Figure 6:
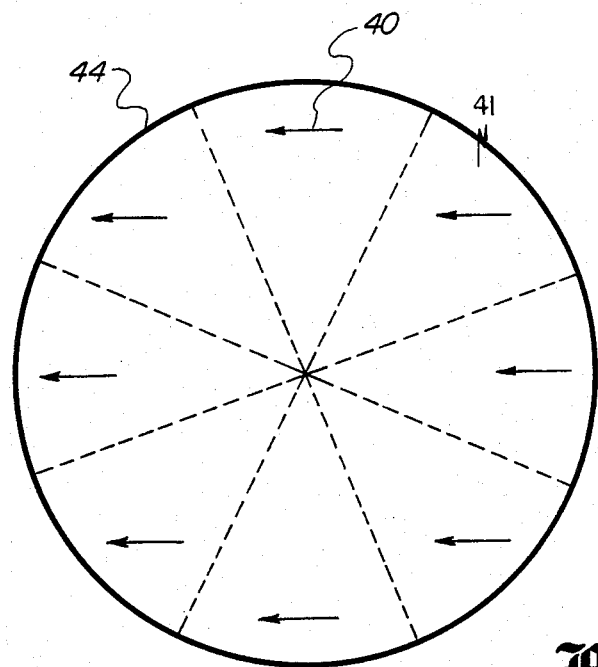
FIG. 6 is a cross-sectional view of an eight-sectioned, circular polarized beam showing representative electric vectors at a given instant.

Turning now to FIGS. 2 and 3, there is shown a first mirror 36 and a second mirror 38 comprising a circular substrate having reflective coatings applied in eight pie-shaped, angular sections 39 each of which are either ±90° phase shift coatings to simulate the performance of plus or minus quarter wave ($\lambda/4$) plate, or aply the appropriate uniform optical path difference ($\delta$ or phase step) to the corresponding section 41 of the (see FIG. 6). In FIGS. 2 and 3, each mirror is viewed as if the observer is facing the direction of propagation. The second mirror 38 is tilted about an axis which is 45° to the vertical and is similar in construction to the first mirror 36 except that the roles of the quarter wave plates and phase step regions are interchanged.

As shown, each mirror has eight sections; however, each mirror may comprise any number of sections. The beam quality improves proportionally with the number of sections. Therefore, the first mirror 36 comprises a first plurality of sections having phase shift coatings and a second plurality of sections having $\delta$ coatings. The second mirror 38 comprises a third plurality of sections having phase shift coatings and a fourth plurality of coatings having $\delta$ coatings.

Referring to FIGS. 2 and 3, it is seen that the center radials of each section are located in the 0°, 45°, 90°, 135°, 180°, 225°, 270°, and 315° positions of the circular mirrors 36 and 38. For the first mirror 36, the phase shift coatings of $\lambda/4$, $-\lambda/4$, $\lambda/4$, and $-\lambda/4$ are located at 45°, 135°, 225°, and 315°, respectively. The $\delta$ coatings of $-\pi/4$, $\pi/4$, $3\pi/4$, and $-3\pi/4$ are located at the 0°, 90°, 180°, and 270° positions, respectively. For the second mirror 38, the phase shift coating of $\pi/4$, $-\pi/4$, $\pi/4$, and $-\pi/4$ are located at the 0°, 90°, 180°, and 270° positions, respectively. The $\delta$ coatings of 0, 0, $\pi$, and $\pi$ are located at the 45°, 135°, 225°, and 315° positions, respectively.

It is important to note that the beam 30 either hits a phase step first and then a $\pm\lambda/4$ plate or a $\pm\lambda/4$ plate first then a phase step as summarized in the beam travel history table of FIG. 4. In addition, two mirrors arranged in this way automatically rotate the beam by 90°.

Figure 5:
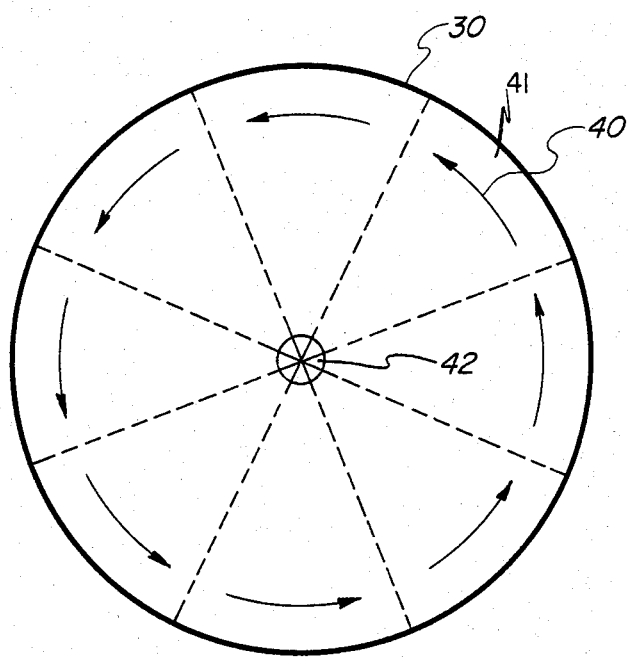
FIG. 5 is a cross-sectional view of an azimuthally polarized beam showing representative electric vectors at a given instant.

The portion of the beam 30 not reflected by the output coupler 22 is directed onto the first mirror 36 and the second mirror 38 in succession. The beam 30 existing between the output coupler 22 and the first mirror 36 is azimuthally polarized, having its electric vectors 40 of the electromagnetic wave perpendicular to a radial of the beam 30 (refer to FIG. 5). The beam 30 is azimuthally polarized due to the phase shifts varying with the angle of incidence with the axicon 20. The electric vectors 40 cancel each other near the center of the azimuthally polarized beam 30 creating a dark spot 42.

Subsequent to the reflection from the first mirror 36 and the second mirror 38, the electric vectors 40 are aligned and in phase resulting in a circular polarized beam 44. Referring to FIG. 6, it may be seen that at any given instant, the electric vectors 40 are aligned.

The performance of this system is evaluated by means of the Jones Matrix approach. In the case when the beam hits a $\pm\lambda/4$ plate and then a uniform phase step, the Jones Matrix is $$\underline{T}_1 = \begin{bmatrix} \cos 2\theta & \sin 2\theta \\ -\sin 2\theta & \cos 2\theta \end{bmatrix} \begin{bmatrix} \cos\theta & -\sin\theta \\ \sin\theta & \cos\theta \end{bmatrix} \begin{bmatrix} e^{i\delta} & 0 \\ 0 & -e^{i\delta} \end{bmatrix} \begin{bmatrix} \cos\theta & \sin\theta \\ -\sin\theta & \cos\theta \end{bmatrix} \begin{bmatrix} 1 & 0 \\ 0 & \pm i \end{bmatrix}$$

$$= \begin{bmatrix} 1 & 0 \\ 0 & \mp i \end{bmatrix} e^{i\delta},$$

$\theta$ = angle between axes of rotation of first mirror 36 and second mirror 38 = 45° and in the case where a uniform phase step is experienced first and then a $\pm\lambda/4$ plate, we have $$\underline{T}_2 = \begin{bmatrix} \cos 2\theta & \sin 2\theta \\ -\sin 2\theta & \cos 2\theta \end{bmatrix} \begin{bmatrix} \cos\theta & -\sin\theta \\ \sin\theta & \cos\theta \end{bmatrix} \begin{bmatrix} 1 & 1 \\ 0 & \pm i \end{bmatrix} \begin{bmatrix} \cos\theta & \sin\theta \\ -\sin\theta & \cos\theta \end{bmatrix} \begin{bmatrix} e^{i\delta} & 0 \\ 0 & -e^{i\delta} \end{bmatrix}$$

$$= -\frac{\sqrt{2}}{2} e^{\pm i\frac{\pi}{4}} \begin{bmatrix} \pm i & 1 \\ 1 & \pm i \end{bmatrix} e^{i\delta},$$

$\theta = 45°$.

In each case, the last matrix on the left is required to transform to the new coordinant system rotated by 90° from the original.

When the phase delays and surface-perpendicular vector phase shifts are as indicated in FIG. 4, the following fields result when the input beam is azimuthally polarized:

$$\phi = \phi_o + \alpha, \quad -22\tfrac{1}{2}° \leq \alpha \leq 22\tfrac{1}{2}°, \quad \hat{e}_\pm = \frac{1}{\sqrt{2}}[\hat{e}_x \pm \hat{e}_y]$$

For $$\begin{aligned}
\phi_o &= 0 & E(\phi) &= -[\cos\alpha\hat{e}_+ - i\sin\alpha\hat{e}_-] \\
\phi_o &= 45° & E(\phi) &= -[\cos\alpha\hat{e}_+ + \sin\alpha\hat{e}_-] \\
\phi_o &= 90° & E(\phi) &= -[\cos\alpha\hat{e}_+ + i\sin\alpha\hat{e}_-] \\
\phi_o &= 135° & E(\phi) &= -[\cos\alpha\hat{e}_+ - \sin\alpha\hat{e}_-] \\
& & E(\phi + 180°) &= E(\phi).
\end{aligned}$$

Thus, the output field is primarily circularly polarized in the $e_+$ direction and its amplitude is never less than $\cos(22\tfrac{1}{2}°) = 0.92$. The undesirable portion is circularly polarized in the opposite direction and disappears at eight locations in azimuth.

The beam quality $$\left(\text{really } \frac{1}{\sqrt{\text{STREHL RATIO}}}\right)$$

associated with this system can be determined from a knowledge of the l=0 component of the field. If the total power of the beam is normalized to unity when integrated over the exit pupil, the beam quality is given by $$BQ = \frac{1}{\sqrt{|a_o|^2 + |b_o|^2}}$$

where $a_o$ and $b_o$ are the l=0 components of the x and y components of the electromagnetic field. In our case $$a_o = \frac{1}{\sqrt{2}} \frac{\sin\frac{\pi}{8}}{\frac{\pi}{8}}$$

$$b_o = \frac{i}{\sqrt{2}} \frac{\sin\frac{\pi}{8}}{\frac{\pi}{8}}$$

Thus, the resultant beam quality is given by $$BQ = \left[\frac{\sin\left(\frac{\pi}{8}\right)}{\left(\frac{\pi}{8}\right)}\right]^{-1} = 1.0262.$$

It can be shown that the beam quality for a similar field obtained by a mirror with n sections is given by $$BQ = \left[\frac{\sin\left(\frac{\pi}{n}\right)}{\frac{\pi}{n}}\right]^{-1}.$$

This function is plotted in FIG. 7 illustrating the fact that increasing the number of sections beyond 12 does not significantly improve beam quality and, in addition, the beam quality is improved to 1.11 with as few as four sections. The beam quality for the mirrors shown with eight sections is 1.03.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for converting an azimuthally polarized beam into a circularly polarized beam, comprising a plurality of mirrors, each mirror comprising a substrate and a plurality of reflective coatings applied to said substrate in angular sections, said mirrors positioned so that said azimuthally polarized beam strikes said mirror in succession and so that a respective portion of said azimuthally polarized beam striking an angular section of a first mirror strikes a corresponding angular section of a succeeding mirror, said corresponding angular sections forming aligned sets of angular sections, at least one of said reflective coatings of each aligned set providing a phase shift within the corresponding portion of said beam, and at least another one of said reflective coatings of each aligned set providing a phase delay within the corresponding portion of said beam so that all said portions of said beam upon completion of a passage of said beam through said plurality of mirrors are substantially in phase and circularly polarized in the same direction.

2. The apparatus of claim 1 wherein said plurality of mirrors comprises:
a first mirror having a first plurality of sections coated to produce a phase shift, and a second plurality of sections coated to apply an optical path difference; and
a second mirror having a first plurality of sections coated to produce a phase shift, and a second plurality of sections coated to apply an optical path difference, said first and second plurality of sections of said second mirror being in optical alignment with said first and second plurality of sections of said first mirror.

3. An apparatus for converting an azimuthally polarized beam into a circularly polarized beam, comprising:
a first mirror comprising a first eight radially disposed sections coated so as to produce a −90° optical path difference, a λ/4 phase shift, a 90° optical path difference, a −λ/4 phase shift, a 270° optical path difference, a λ/4 phase shift, a −270° optical path difference, and a λ/4 phase shift, sequentially; and a second mirror comprising eight radially disposed sections optically aligned so as to correspond with said first secions and coated so as to produce a λ/4 phase shift, a 0° optical path difference, a λ/4 phase shift, a 0° optical path difference, a λ/4 phase shift, a 180° optical path difference, a −λ/4 phase shift, and a 180° optical path difference, sequentially.

4. A method of creating a substantially circularly polarized beam, comprising the steps of:

lasting an azimuthally polarized beam; and reflecting said azimuthally polarized beam off a plurality of mirrors, each of said mirrors comprising a substrate and a plurality of reflective coatings applied to said substrate in angular sections, said mirrors positioned so that said azimuthally polarized beam strikes said mirror in succession and so that a respective portion of said azimuthally polarized beam striking an angular section of a first mirror strikes a corresponding angular section of a succeeding mirror, said corresponding angular sections forming aligned sets of angular sections, at least one of said reflective coatings of each aligned set providing a phase shift within the corresponding portion of said beam, and at least another one of said reflective coatings of each aligned set providing a phase delay within the corresponding portion of said beam so that all said portions of said beam upon completion of a passage of said beam through said plurality of mirrors are substantially in phase and circularly polarized in the same direction.

5. The method of claim 4 wherein said reflecting step comprises the steps of:

reflecting the azimuthally polarized beam off of a first mirror having eight radially disposed, coated sections sequentially comprised of a −90° optical path difference, a λ/4 phase shift, a 90° optical path difference, a −λ/4 phase shift, a 270° optical path difference, a λ/4 phase shift, a −270° optical path difference, and a −λ/4 phase shift; and reflecting the resultant beam off a second mirror having eight radially disposed, coated sections sequentially comprised of a λ/4 phase shift, a 0° optical path difference, a −λ/4 phase shift, a 0° optical phase difference, a λ/4 phase shift, a 180° optical path difference, a −λ/4 phase shift, and a 180° optical phase difference.

6. A method of converting an azimuthally polarized beam into a circularly polarized beam, comprising the step of:

reflecting said azimuthally polarized beam off a plurality of mirrors, each of said mirrors comprising a substrate and a plurality of reflective coatings applied to said substrate in angular sections, said mirrors positioned so that said azimuthally polarized beam strikes said mirrors in succession and so that a respective portion of said azimuthally polarized beam striking an angular section of a first mirror strikes a corresponding angular section of a succeeding mirror, said corresponding angular sections forming aligned sets of angular sections, at least one of said reflective coatings of each aligned set providing a phase shift within the corresponding portion of said beam, and at least another one of said reflective coatings of each aligned set providing a phase delay within the corresponding portion of said beam so that all said portions of said beam upon completion of a passage of said beam through said plurality of mirrors are substantially in phase and circularly polarized in the same direction.

7. A method of converting an azimuthally polarized beam into a circularly polarized beam comprising the steps of:

reflecting the azimuthally polarized beam off of a first mirror having eight radially disposed, coated sections sequentially comprised of a −90° optical path difference, a λ/4 phase shift, a 90° optical path difference, a −λ/4 phase shift, a 270° optical path difference, a λ/4 phase shift, a −270° optical path difference, and a −λ/4 phase shift; and reflecting the resultant beam off of a second mirror having eight radially disposed, coated sections sequentially comprised of λ/4 phase shift, a 0° optical path difference, a −λ/4 phase shift, a 0° optical phase difference, a λ/4 phase shift, a 180° optical path difference, a −λ/4 phase shift, and a 180° optical phase difference.

8. An apparatus for converting an azimuthally polarized beam into a circular polarized beam, comprising:

a first mirror comprising a first eight radially disposed sections coated so as to produce a −90° optical path difference, a λ/4 phase shift, a 90° optical path difference, a −λ/4 phase shift, a 270° optical path difference, a λ/4 phase shift, a −270° optical path difference, and a λ/4 phase shift, sequentially; and a second mirror comprising a second eight radially disposed section aligned so as to be optically aligned with said first sections and coated so as to produce a λ/4 phase shift, a 0° optical path difference, a −λ/4 phase shift, a 0° optical path difference, a λ/4 phase shift, a 180° optical path difference, a −λ/4 phase shift, and a 180° optical path difference, sequentially, said mirror sections dividing the azimuthally polarized beam into eight beams each of which is reflected from a set of mirror sections one of which is on the first mirror and the other of which is on the second mirror, the set of sections for each beam being a different set from any of the others, each set including an optical path difference section and a phase shift section.

9. A method of converting an azimuthally polarized beam into a circular polarized beam comprising the steps of:

reflecting the linearly polarized beam off a first mirror having eight radially disposed, coated sections sequentially comprised of a 31 90° optical path difference, a λ/4 phase shift, a 90° optical path difference, a −λ/4 phase shift, a 270° optical path difference, a λ/4 phase shift, a −270° optical path difference, and a −λ/4 shift; and reflecting the resultant beam off of a second mirror having eight radially disposed, coated-sections sequentially comprised of λ/4 phase shift, a 0° optical path difference, a −λ/4 phase shift, a 0° optical phase difference, a λ/4 phase shift, a 180° optical path difference, a −λ/4 phase shift, and a 180° optical path difference, said mirror sections dividing the azimuthally polarized beam into eight beams each of which is reflected from a set of mirror sections one of which is on the first mirror and the other of which is on the second mirror, the set of sections for each beam being a different set from any of the others, each set including an optical path difference section and a phase shift section.

10. A laser system for generating a uniformly circularly polarized beam, said laser system comprising:
means for emitting an azimuthally polarized beam of laser light; and
a plurality of mirrors external of said laser means for converting said azimuthally polarized beam into a uniformly circularly polarized beam, each mirror comprising a substrate and a plurality of reflective coatings applied to said substrate in angular sections, said mirrors positioned so that said azimuthally polarized beam strikes each said mirror in succession and so that a respective portion of said azimuthally polarized beam striking an angular section of a first mirror strikes a corresponding angular section of a succeeding mirror, said corresponding angular sections forming aligned sets of angular sections, at least one of said reflective coatings of each aligned set providing a phase shift within the corresponding portion of said beam, and at least another one of said reflective coatings of each aligned set providing a phase delay within the corresponding portion of said beam so that all said portions of said beam upon completion of a passage of said beam through said plurality of mirrors are substantially in phase and circularly polarized in the same direction.

11. A laser system of claim 10 wherein said plurality of mirrors includes:

a first mirror having a first plurality of angular sections coated to produce a phase shift, and a second plurality of angular sections coated to apply an optical path difference; and
a second mirror having a first plurality of sections coated to produce a phase shift, and a second plurality of sections coated to apply an optical path difference, said first and second plurality of sections of said first mirror being in optical alignment with the said first and second plurality of sections of said second mirror, respectively, wherein a phase shift coating on said first mirror corresponds with an optical path difference coating on said second mirror and an optical path difference coating on said first mirror corresponds with phase shift coatings on said second mirror.

12. The laser of claim 11, wherein said coatings comprise materials producing, on the sections of said first mirror, a $-90°$ optical path difference, a $\lambda/4$ phase shift, a $90°$ optical path difference, a $-\lambda/4$ path shift, a $270°$ optical path difference, a $\lambda/4$ phase shift, a $-270°$ optical path difference, and a $-\lambda/4$ phase shift, sequentially, and on the sections of said second mirror produce a $\lambda/4$ phase shift, a $0°$ optical path difference, a $-\lambda/4$ phase shift, a $0°$ optical path difference, a $\lambda/4$ phase shift, a $180°$ optical path difference, a $-\lambda/4$ path shift, and a $180°$ optical path difference, sequentially.

13. The laser system of claim 10 wherein said laser is a chemical laser having at least one axicon mirror.

* * * * *